(12) United States Patent
Delorenzis et al.

(10) Patent No.: US 11,745,557 B2
(45) Date of Patent: Sep. 5, 2023

(54) DAMPING AIR SPRING FOR HEAVY-DUTY VEHICLE AXLE/SUSPENSION SYSTEMS

(71) Applicant: Hendrickson USA, L.L.C., Schaumburg, IL (US)

(72) Inventors: Damon Delorenzis, Plainfield, IL (US); Jeff R. Zawacki, Channahon, IL (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 0 days.

(21) Appl. No.: 17/888,655

(22) Filed: Aug. 16, 2022

(65) Prior Publication Data

US 2023/0069024 A1 Mar. 2, 2023

Related U.S. Application Data

(60) Provisional application No. 63/237,832, filed on Aug. 27, 2021.

(51) Int. Cl.
*B60G 15/12* (2006.01)
*B60G 11/27* (2006.01)

(52) U.S. Cl.
CPC .............. *B60G 15/12* (2013.01); *B60G 11/27* (2013.01); *B60G 2202/152* (2013.01); *B60G 2206/424* (2013.01); *B60G 2300/026* (2013.01)

(58) Field of Classification Search
CPC ... B60G 2202/152; B60G 11/27; B60G 15/12
See application file for complete search history.

(56) References Cited

U.S. PATENT DOCUMENTS

| | | | | |
|---|---|---|---|---|
| 4,477,062 A | * | 10/1984 | Smeltzer | F16F 9/32 422/164 |
| 6,161,821 A | * | 12/2000 | Leno | B60G 17/0416 188/322.19 |
| 6,322,058 B1 | * | 11/2001 | Tanigawa | B60G 15/12 188/269 |
| 6,412,759 B1 | | 7/2002 | Krauss | |
| 8,540,222 B2 | | 9/2013 | Westnedge et al. | |
| 9,139,061 B2 | | 9/2015 | Delorenzis | |
| 9,157,529 B2 | | 10/2015 | Westnedge et al. | |
| 9,308,796 B2 | * | 4/2016 | Leonard | B60G 11/27 |
| 9,370,984 B2 | * | 6/2016 | Leonard | F16F 9/052 |

(Continued)

FOREIGN PATENT DOCUMENTS

| | | |
|---|---|---|
| DE | 102015209107 A1 | 11/2016 |
| GB | 890822 A | 3/1962 |

(Continued)

*Primary Examiner* — Drew J Brown
*Assistant Examiner* — Maxwell L Meshaka
(74) *Attorney, Agent, or Firm* — Dureska & Moore, LLC; David P. Dureska; Brent L. Moore (57) ABSTRACT

A damping air spring for heavy-duty vehicle axle/suspension systems. The damping air spring includes a first chamber and a second chamber and at least one opening between the first chamber and second chamber to provide restricted fluid communication between the first chamber and the second chamber. An adsorptive material is disposed within the first chamber or the second chamber and works in conjunction with the at least one opening to provide damping characteristics to the air spring over a first and second critical range of frequencies.

17 Claims, 5 Drawing Sheets

(56) References Cited

U.S. PATENT DOCUMENTS

| | | | |
|---|---|---|---|
| 9,695,901 B2* | 7/2017 | Leonard | F16F 9/05 |
| 9,738,131 B2 | 8/2017 | Keeler et al. | |
| 9,744,824 B2 | 8/2017 | Fulton et al. | |
| 9,784,330 B2 | 10/2017 | Coakley et al. | |
| 9,849,745 B2 | 12/2017 | Fulton et al. | |
| 10,005,333 B2* | 6/2018 | Leonard | F16F 9/057 |
| 10,118,453 B2 | 11/2018 | Delorenzis | |
| 10,137,751 B2 | 11/2018 | Berg et al. | |
| 10,161,471 B2* | 12/2018 | Leonard | B60G 17/052 |
| 10,343,478 B2 | 7/2019 | Coakley et al. | |
| 10,352,503 B2 | 7/2019 | Coakley et al. | |
| 10,465,763 B2* | 11/2019 | Bounds | B60G 11/27 |
| 10,525,785 B2* | 1/2020 | Rose | F16F 9/04 |
| 10,533,621 B2 | 1/2020 | Coakley et al. | |
| 11,421,750 B2* | 8/2022 | Zegveld | B60G 15/12 |
| 2012/0061887 A1 | 3/2012 | Westnedge et al. | |
| 2013/0192067 A1* | 8/2013 | Leonard | B60G 11/27 29/896.9 |
| 2014/0167337 A1 | 6/2014 | Ramsey et al. | |
| 2015/0217617 A1* | 8/2015 | Leonard | F16F 13/06 280/124.16 |
| 2016/0108986 A1* | 4/2016 | Leonard | B60N 2/525 248/565 |
| 2016/0121682 A1* | 5/2016 | Leonard | F16F 9/04 280/124.161 |
| 2017/0182858 A1* | 6/2017 | Coakley | B60G 17/048 |
| 2017/0211649 A1* | 7/2017 | Leonard | B60G 15/12 |
| 2017/0240020 A1 | 8/2017 | Delorenzis et al. | |
| 2017/0241504 A1* | 8/2017 | Delorenzis | F16K 3/03 |
| 2017/0363169 A1* | 12/2017 | Bounds | F16F 9/34 |
| 2018/0079274 A1* | 3/2018 | Rose | B60G 17/0521 |
| 2018/0257449 A1 | 9/2018 | Delorenzis et al. | |
| 2019/0249745 A1 | 8/2019 | Long | |
| 2019/0337346 A1 | 11/2019 | Delorenzis et al. | |
| 2019/0351727 A1 | 11/2019 | Zawacki et al. | |
| 2019/0366789 A1 | 12/2019 | Naples et al. | |
| 2020/0039310 A1 | 2/2020 | Delorenzis et al. | |
| 2020/0254843 A1 | 8/2020 | Fulton et al. | |
| 2021/0364057 A1* | 11/2021 | Zegveld | B60G 15/12 |

FOREIGN PATENT DOCUMENTS

| | | | | |
|---|---|---|---|---|
| WO | WO-2011026549 A1 * | 3/2011 | | B60G 15/12 |
| WO | 2022153069 A1 | 7/2022 | | |

* cited by examiner

DAMPING AIR SPRING FOR HEAVY-DUTY VEHICLE AXLE/SUSPENSION SYSTEMS

CROSS-REFERENCE TO RELATED APPLICATION

This application claims the benefit of U.S. Provisional Patent Application Ser. No. 63/237,832 filed on Aug. 27, 2021.

BACKGROUND

Technical Field

The present invention relates generally to the art of axle/suspension systems for heavy-duty vehicles. More particularly, the invention relates to axle/suspension systems for heavy-duty vehicles which utilize air springs to cushion the ride of the heavy-duty vehicle. More specifically, the invention is directed to a damping air spring for heavy-duty vehicle axle/suspension systems, in which the air spring utilizes an adsorptive material and distributed restricted openings to provide improved damping characteristics to the air spring at critical frequencies.

Background Art

The use of air-ride beam-type axle/suspension systems in heavy-duty vehicles is known. For the purpose of clarity and convenience, reference is made to a heavy-duty vehicle with the understanding that such reference includes trucks, tractor-trailers and semi-trailers, trailers, and the like. Although axle/suspension systems for heavy-duty vehicles can be found in widely varying structural forms, the various structures are generally similar in that each axle/suspension system typically includes a pair of suspension assemblies. The suspension assemblies are typically connected directly to a primary frame of the heavy-duty vehicle or a subframe supported by the primary frame. For those heavy-duty vehicles that support a subframe, the subframe can be non-movable or movable, the latter being commonly referred to as a slider box, slider subframe, slider undercarriage, secondary slider frame, or bogey.

Each suspension assembly of an axle/suspension system includes a longitudinally-extending elongated beam. The beam may extend rearwardly or frontwardly relative to the front of the heavy-duty vehicle, thus defining what are typically referred to as trailing- or leading-arm axle/suspension systems, respectively. However, for the purpose of clarity and conciseness, it is to be understood that the term trailing-arm as used in the instant application encompasses beams which extend either rearwardly or frontwardly with respect to the front end of the heavy-duty vehicle. Each beam typically is located adjacent to and below a respective one of a pair of spaced-apart, longitudinally-extending main members and one or more cross members that form the frame or subframe of the heavy-duty vehicle. For the purpose of clarity and conciseness, reference herein will be made to main members with the understanding that such reference includes main members of primary frames, movable subframes, and non-movable subframes. Each beam is pivotally connected at one of its ends to a hanger, which is attached to and depends from a respective one of the main members of the frame of the heavy-duty vehicle. An axle extends transversely between, and typically is connected to, the beams of the pair of suspension assemblies at a selected location from about the mid-point of each beam to the end of the beam opposite its pivotal connection to its respective hanger. A wheel is rotatably mounted on each outboard end of the axle in a manner known in the art. An air spring, or other spring mechanism, is connected to and extends between the beam end opposite the pivotal connection to the hanger and a respective one of the main members. A brake system and, optionally, one or more shock absorbers are also mounted on the axle/suspension system in a manner known in the art.

The axle/suspension systems of the heavy-duty vehicle act to cushion the ride, damp vibrations, and stabilize the heavy-duty vehicle during vehicle operation. More particularly, as the heavy-duty vehicle is traveling over the road, the wheels encounter road conditions that impart various forces, loads, and/or stresses, collectively referred to herein as forces, to the respective axle on which the wheels are mounted, and in turn, to the suspension assemblies that are connected to and support the axle. These forces include vertical forces caused by vertical movement of the wheels as they encounter certain road conditions, fore-aft forces caused by acceleration and deceleration of the heavy-duty vehicle, as well as certain road conditions, and side-load and torsional forces associated with transverse heavy-duty vehicle movement, such as turning and lane-change maneuvers.

In order to minimize the detrimental effect of these forces on the heavy-duty vehicle during operation, the axle/suspension system is designed to react and/or absorb at least some of these forces. In particular, the axle/suspension system is designed with structural characteristics to address these disparate forces. More particularly, the axle/suspension system is designed to have beams that are fairly stiff in order to minimize the amount of sway experienced by the heavy-duty vehicle and thus provide roll stability, as is known. However, it is also desirable for the axle/suspension system to be relatively flexible to assist in cushioning the heavy-duty vehicle from vertical impacts and provide the axle/suspension system with compliance to resist failure and increase durability. Moreover, it is desirable to damp the vibrations or oscillations that result from these forces. For heavy-duty vehicles, increased damping of the axle/suspension system is critical in the frequency ranges from about 0.8 to about 2.0 Hz, body bounce mode, and from about 8 to about 15 Hz, wheel hop mode. At these frequencies, the axle/suspension system is predisposed to move such that road inputs at these frequencies may result in a harmonic build-up of movement in the axle/suspension system that can potentially adversely affect the performance of the axle/suspension system, and thus the heavy-duty vehicle.

A key component of the axle/suspension system that cushions the ride of the heavy-duty vehicle from vertical impacts is the air spring. Prior art air springs without damping characteristics or non-damping air springs generally include three main components: a flexible bellows, a piston, and a bellows top plate. The bellows is typically formed from rubber or other flexible material, and is sealingly engaged with the bellows top plate and the top portion of the piston. The volume of pressurized air, or "air volume", that is contained within the air spring is a major factor in determining the spring rate, or stiffness, of the air spring. More specifically, this air volume is contained within the bellows and, in some cases, also the piston of the air spring via unrestricted air flow between the piston and the bellows. The larger the air volume of the air spring, the lower the spring rate, or stiffness, of the air spring. Alternatively, prior art air springs without damping characteristics have also utilized activated carbon to effectively reduce the spring rate without increasing the structural volume of the air spring. A lower spring rate, or reduced stiffness, is generally more desirable in the heavy-duty vehicle industry because it decreases vibrations transmitted to the main members of the heavy-duty vehicle, allowing for softer ride characteristics.

Prior art air springs without damping characteristics, while adequately cushioning the heavy-duty vehicle cargo and occupant(s) during operation, provide little if any damping characteristics to the axle/suspension system. As a result, damping at critical frequency ranges is typically provided by a pair of hydraulic shock absorbers, although a single shock absorber has also been utilized, as is known. However, these shock absorbers experience changes and limitations in their damping performance. In particular, shock absorbers typically experience changes in performance characteristics over time as they wear, causing changes in the ride and handling characteristics of the heavy-duty vehicle over time that, in turn, may cause additional wear of the tires and other components of the axle/suspension system over time. More particularly, these changes can potentially increase operational costs of the heavy-duty vehicle.

Moreover, the performance of the shock absorbers is typically optimized for a design load of the shock absorbers and does not vary based on payload. Thus, as payload is added or removed from the heavy-duty vehicle, the performance of the shock absorbers may potentially become non-optimal. More specifically, shock absorbers are typically designed for the heaviest expected payload of the heavy-duty vehicle such that the axle/suspension system will become overdamped for lighter loads, potentially increasing wear on the tires and other components of the axle/suspension system. In addition, shock absorbers are a service item of the axle/suspension system that require maintenance and/or replacement from time to time, resulting in increased maintenance and/or replacement costs of the axle/suspension system.

Shock absorbers also add varying degrees of complexity and weight to the axle/suspension system. In particular, the amount of cargo that a heavy-duty vehicle may carry is governed by local, state, and/or national road and bridge laws that limit the maximum load that a heavy-duty vehicle may carry, as well as the maximum load that may be supported by individual axles of the heavy-duty vehicle. More particularly, because shock absorbers are relatively heavy, the shock absorbers add undesirable weight to the axle/suspension system, thereby reducing the amount of cargo that can be carried by the heavy-duty vehicle.

As a result, prior art air springs with damping characteristics have been developed and may be utilized in heavy-duty air-ride axle/suspension systems. Such prior art damping air springs are generally similar in structure to prior art non-damping air springs, but instead include a piston having a piston chamber. The piston generally has one or more openings extending through a piston top plate such that the openings are capable of providing restricted fluid communication between the bellows and piston chamber. The restricted fluid communication between the bellows and the piston chamber during heavy-duty vehicle operation provides damping to the axle/suspension system. More specifically, when the axle/suspension system experiences a jounce or rebound event, the bellows is compressed or expanded, respectively, causing the internal pressure of the bellows to increase or decrease, respectively. The change of pressure within the bellows creates a pressure differential between the bellows and the piston chamber that causes air to flow between the bellows and piston chamber through the opening(s) of the piston top plate causing damping to occur.

The separate volumes of air in the bellows and piston chamber of prior art damping air springs are major factors in determining the damping energy of the air spring. Generally, the smaller the bellows volume and the greater the piston volume, i.e., the smaller the bellows-to-piston volume ratio, the greater the damping energy of the air spring. It is generally more desirable in the heavy-duty vehicle industry for an air spring to have a greater damping energy because it provides a more controlled ride for the heavy-duty vehicle during operation. Thus, a larger piston may be used, whereby the bellows volume is reduced and the piston chamber volume is increased, thereby increasing damping energy.

Prior art air springs with damping characteristics, while providing adequate damping to the axle/suspension system of the heavy-duty vehicle, have potential disadvantages, drawbacks, and limitations. For example, as described above, heavy-duty vehicles generally have multiple critical frequency ranges where increased damping of the axle/suspension system is crucial, such as from about 0.8 Hz to about 2.0 Hz, body bounce mode, and from about 8 Hz to about 15 Hz, wheel hop mode. However, prior art damping air springs generally only provide peak damping characteristics for a single critical frequency range, typically in the critical frequency range from about 0.8 Hz to about 2.0 Hz, body bounce mode, and thus do not provide optimal damping over the multiple critical frequency ranges. In addition, prior art damping air springs generally require a greater piston volume and reduced bellows volume, as described above. However, increasing the piston volume at the expense of the bellows volume may potentially cause the piston to limit or impinge on the travel distance of the air spring.

Therefore, it is desirable to have an air spring with damping features that provides a piston chamber with an increased functional volume and increased damping over both the body bounce mode and wheel hop mode critical frequency ranges without altering the structural volume of the piston. By providing an air spring for heavy-duty vehicles having improved damping characteristics without changing the structural volume of the piston, air spring travel distance is maintained and the shock absorber of the axle/suspension system can be eliminated or its size reduced, reducing complexity, saving weight and cost, and allowing the heavy-duty vehicle to haul more cargo. The damping air spring for heavy-duty vehicle axle/suspension systems of the present invention satisfies these needs.

BRIEF SUMMARY OF THE INVENTION

An objective of the present invention is to provide an air spring with improved damping characteristics.

Another objective of the present invention is to provide an air spring with improved damping characteristic at multiple critical frequency ranges.

Yet another objective of the present invention is to provide an air spring that eliminates or reduces the need for shock absorbers to provide damping at critical frequencies.

These objectives and others are achieved by the damping air spring for heavy-duty vehicle axle/suspension systems of the present invention, which includes: a first chamber; a second chamber; at least one opening, the at least one opening being between the first chamber and the second chamber and providing restricted fluid communication between the first chamber and the second chamber; and an adsorptive material disposed within the first chamber or the second chamber, the adsorptive material working in conjunction with the first chamber, the second chamber, and the at least one opening to provide damping characteristics to the damping air spring.

BRIEF DESCRIPTION OF THE SEVERAL VIEWS OF THE DRAWINGS

The exemplary embodiment of the present invention, illustrative of the best mode in which Applicant has contemplated applying the principles, is set forth in the following description and shown in the drawings.

Similar reference characters refer to similar parts throughout.

DETAILED DESCRIPTION OF THE INVENTION

Figure 1:
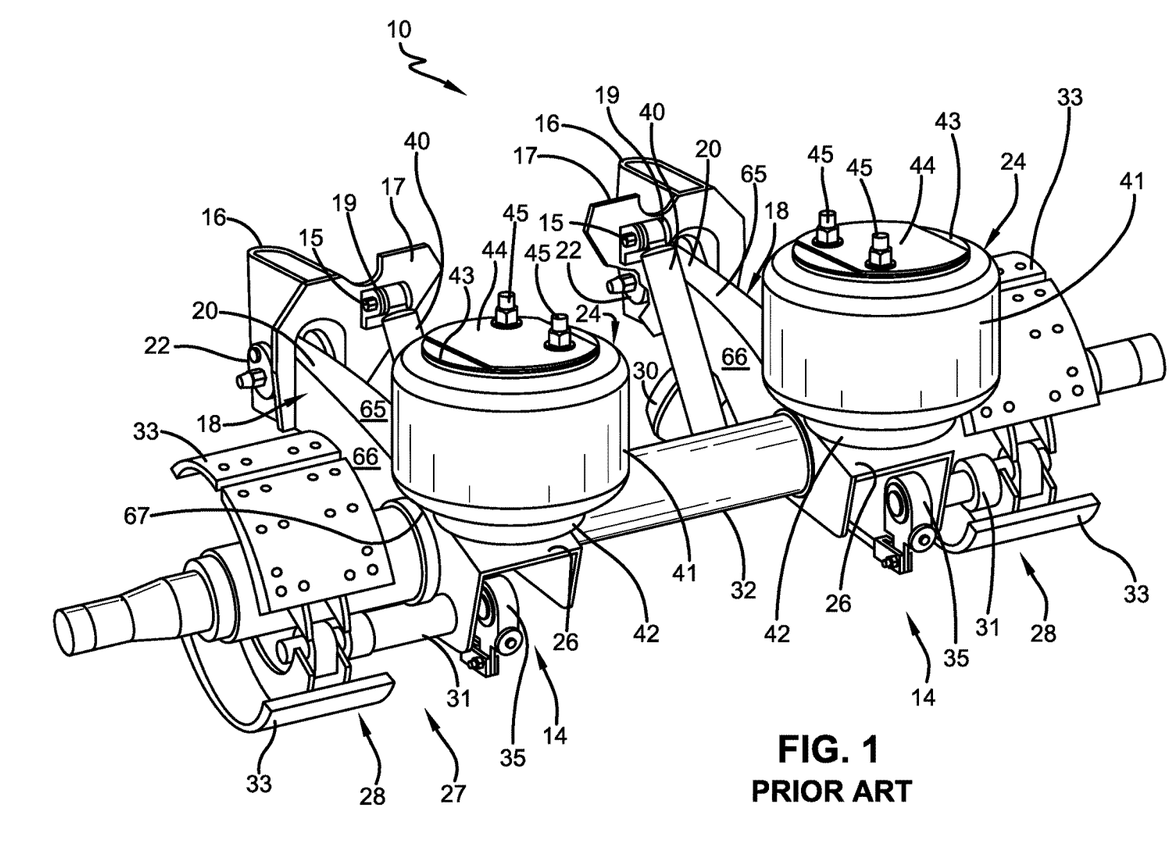
FIG. 1 is a top rear perspective view of a trailing arm axle/suspension system for a heavy-duty vehicle incorporating a pair of prior art non-damping air springs and a pair of shock absorbers, showing each one of the prior art air springs and each one of the shock absorbers mounted on a respective one of the suspension assemblies of the axle/suspension system.

In order to better understand the environment in which the damping air spring for heavy-duty vehicle axle/suspension systems of the present invention is utilized, a trailing-arm beam-type air-ride axle/suspension system that incorporates a pair of prior art non-damping air springs 24 is shown in FIG. 1 and is indicated generally at 10, and will now be described. Axle/suspension system 10 is typically mounted on a pair of longitudinally-extending spaced-apart main members (not shown) of a frame (not shown) of a heavy-duty vehicle (not shown). Axle/suspension system 10 generally includes a pair of mirror-image suspension assemblies 14. Inasmuch as suspension assemblies 14 are mirror images of one another, for the purpose of conciseness and clarity, only one of the suspension assemblies will be described in detail below.

Suspension assembly 14 includes a trailing-arm overslung beam 18 formed having a generally upside-down integrally formed U-shape structure that includes a pair of sidewalls 66 and a top wall 65, with the open portion of the beam facing generally downwardly. A bottom plate (not shown) extends between and is attached to the lowermost ends of sidewalls 66 by suitable means, such as welding. Beam 18 includes a front end 20 having a bushing assembly 22, as is known, to facilitate pivotal connection of the beam to a hanger 16, which in turn is attached to a respective main member of the frame of the heavy-duty vehicle. Beam 18 also includes a rear end 26. A transversely-extending axle 32 is disposed through openings 67 formed in sidewalls 66 of beam 18 and is rigidly connected thereto using suitable means, such as welding.

Suspension assembly 14 also includes prior art non-damping air spring 24, mounted on and extending between rear end 26 of beam 18 and the main member (not shown) of the frame (not shown) of the heavy-duty vehicle (not shown). Prior art air spring 24 generally includes a bellows 41 and a piston 42. The top portion of bellows 41 is sealingly engaged with a bellows top plate 43. An air spring mounting plate 44 is mounted on bellows top plate 43 by fasteners 45, which are also used to mount the top portion of air spring 24 to the main member of the frame of the heavy-duty vehicle. Piston 42 is generally cylindrically shaped and has a generally flat bottom plate (not shown) and top plate (not shown). The bottom portion of bellows 41 is sealingly engaged with the top plate of piston 42. The bottom plate of piston 42 rests on and is attached to top wall 65 of beam 18 at rear end 26 of the beam, as is known. Typically, the top plate of piston 42 is formed without openings so that there is no fluid communication between the piston and bellows 41. As a result, piston 42 does not generally contribute any appreciable volume to air spring 24. Alternatively, the top plate of piston 42 may be formed with large openings to allow unrestricted fluid communication between bellows 41 and the piston in order to increase the volume of air spring 24 and lower the spring rate of the air spring, as is known.

Suspension assembly 14 also includes a shock absorber 40. The top end of shock absorber 40 is mounted on an inboardly extending wing 17 of hanger 16 via a mounting bracket 19 and a fastener 15, as is known. The bottom end of shock absorber 40 is mounted to beam 18 in a manner known in the art. For completeness, axle/suspension system 10 is shown with a pair of brake assemblies 28 of a drum brake system 27 incorporated into the axle/suspension system to provide braking to the heavy-duty vehicle in a manner known in the art, each of which includes a brake chamber 30, a cam shaft assembly 31, a slack adjuster 35, and a pair of brake shoes 33 mounted on components of a respective suspension assembly 14 or the outboard end of axle 32.

Axle/suspension system 10 is designed to react and/or absorb forces that act on the heavy-duty vehicle during operation. In particular, it is desirable for axle/suspension system 10 to be rigid or stiff in order to resist roll forces and thus provide roll stability for the heavy-duty vehicle. This is typically accomplished via beam 18, which is rigid and also rigidly attached to axle 32. It is also desirable, however, for axle/suspension system 10 to be flexible to assist in cushioning the heavy-duty vehicle from vertical impacts and to provide the axle/suspension system with compliance to resist failure. Such flexibility is typically achieved through the pivotal connection of beam 18 to hanger 16 with bushing assembly 22. In addition, prior art air spring 24 cushions the ride for cargo and passengers.

Prior art non-damping air spring 24, while providing adequate cushioning to the heavy-duty vehicle cargo and/or occupant(s) during operation, has potential disadvantages, drawbacks, and limitations. For example, prior art air spring 24 has very limited or no damping capabilities. Instead, suspension assembly 14 relies on shock absorbers 40 to provide damping to axle/suspension system 10. However, shock absorbers 40 are relatively heavy, adding weight to axle/suspension system 10, and thus the heavy-duty vehicle, thereby reducing the amount of cargo that can be carried by the vehicle. Shock absorbers 40 are also service items of axle/suspension system 10 that will require maintenance and/or replacement from time to time, increasing complexity, maintenance, and cost.

Figure 2:
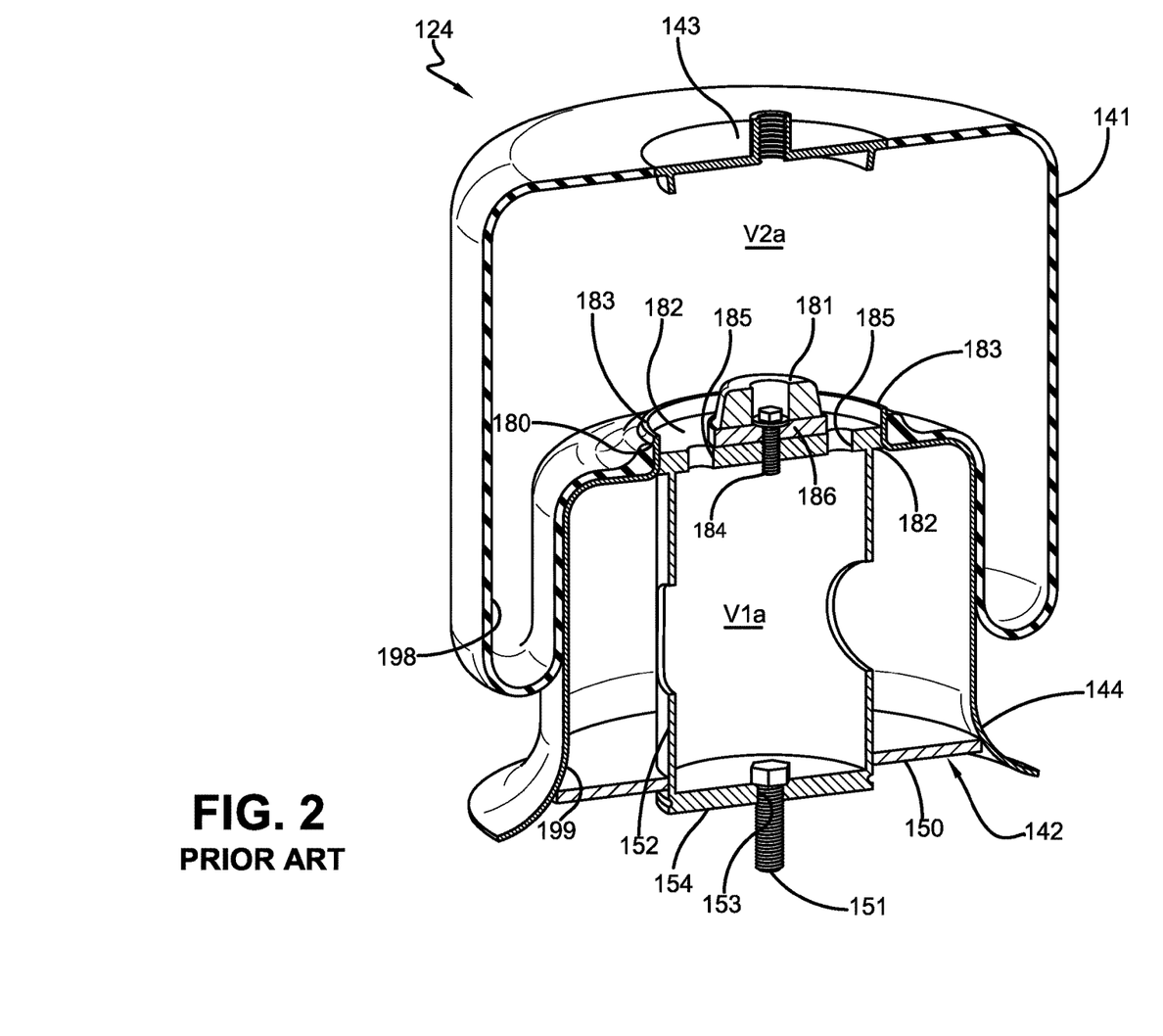
FIG. 2 is a perspective view, in cross-section, of a prior art air spring with damping characteristics.

In order to further understand the damping air spring for heavy-duty vehicle axle/suspension systems of the present invention, a prior art damping air spring, such as may be used in axle/suspension system 10, is shown in FIG. 2 and is indicated generally at 124, and will now be described. Prior art damping air spring 124 generally includes a bellows 141 and a piston 142. The top end of bellows 141 is sealingly engaged with a bellows top plate 143 in a manner known in the art. An air spring mounting plate (not shown) is mounted on the top surface of bellows top plate 143 by fasteners (not shown), which are also used to mount the top end of air spring 124 to a respective one of the main members (not shown) of the frame (not shown) of the heavy-duty vehicle (not shown). Alternatively, bellows top plate 143 may be attached directly to a respective one of the main members of the frame of the heavy-duty vehicle. Piston 142 is generally cylindrical-shaped and includes a continuous generally stepped sidewall 144 attached to a generally flat bottom plate 150. Piston 142 includes a top plate 182 that is integrally formed with or otherwise rigidly attached to sidewall 144 of the piston. Piston 142 further includes a generally cylindrical-shaped central hub 152 which extends upwardly from bottom plate 150 to top plate 182. Central hub 152 includes a bottom plate 154 formed with a central opening 153. A fastener 151 is disposed through central opening 153 and is utilized to attach piston 142 to top wall 65 (FIG. 1) of beam 18 (FIG. 1) at rear end 26 (FIG. 1) of the beam.

Top plate 182 of piston 142 is formed with a circular upwardly-extending protrusion 183 having a lip 180 around its circumference. Lip 180 cooperates with the lowermost end of bellows 141 to form an air-tight seal between the bellows and the lip in a manner known in the art. A bumper 181 is rigidly attached to a bumper mounting plate 186, which, in turn, is mounted on top plate 182 of piston 142 by a fastener 184. Bumper 181 extends upwardly from the top surface of bumper mounting plate 186 and provides a cushion between top plate 182 of piston 142 and bellows top plate 143 in order to prevent the top plates from contacting and potentially damaging one another during operation of the heavy-duty vehicle.

Top plate 182, sidewall 144, bottom plate 150, and bottom plate 154 of piston 142 define a piston chamber 199 having an internal volume V1$a$. Bellows 141, bellows top plate 143, and top plate 182 of piston 142 define a bellows chamber 198 having an internal volume V2$a$ at standard static ride height. Top plate 182 of piston 142 is formed with a pair of openings 185, which provide restricted fluid communication between internal volume V1$a$ of piston chamber 199 and internal volume V2$a$ of bellows chamber 198. More particularly, openings 185 allow fluid or air to pass between piston chamber 199 and bellows chamber 198 during operation of the heavy-duty vehicle, as will be described in detail below. Openings 185 may be circular, or any other suitable shape, and may have a cross-sectional area in the range of from about 0.039 in.$^2$ to about 0.13 in.$^2$. The ratio of the cross-sectional area of openings 185 measured in square inches (in.$^2$) to the volume of piston chamber 199 measured in cubic inches (in.$^3$) to the volume of bellows chamber 198 measured in cubic inches (in.$^3$) is typically in the range of ratios of from about 1:600:1200 to about 1:14100:23500. This is an inclusive range of ratios that may be alternatively expressed as 1:600-14100:1200-23500, including any combination of ratios in between, and, for example, would necessarily include the following ratios: 1:600:23500 and 1:14100:1200.

During operation of the heavy-duty vehicle, when axle 32 of axle/suspension system 10 experiences a jounce event, such as when the wheels of the heavy-duty vehicle encounter a curb or a raised bump in the road, the axle moves vertically upwardly toward the main members of the frame of the heavy-duty vehicle. As a result, bellows 141 is compressed by axle/suspension system 10 as the wheels of the heavy-duty vehicle travel over the curb or the raised bump in the road. The compression of bellows 141 causes the internal pressure of bellows chamber 198 to increase, creating a pressure differential between the bellows chamber and piston chamber 199. This pressure differential causes air to flow from bellows chamber 198 through openings 185 into piston chamber 199, reducing the pressure differential and causing damping to occur. Air continues to flow back and forth between bellows chamber 198 and piston chamber 199 through openings 185 until pressures within the piston chamber and the bellows chamber have equalized.

Conversely, when axle 32 of axle/suspension system 10 experiences a rebound event, such as when the wheels of the heavy-duty vehicle encounter a large hole or depression in the road, the axle moves vertically downwardly away from the main members of the frame of the heavy-duty vehicle. As a result, bellows 141 is expanded by axle/suspension system 10 as the wheels of the heavy-duty vehicle travel into the hole or depression in the road. The expansion of bellows 141 causes the internal pressure of bellows chamber 198 to decrease, creating a pressure differential between the bellows chamber and piston chamber 199. This pressure differential causes air to flow from piston chamber 199 through openings 185 into bellows chamber 198, reducing the pressure differential and causing damping to occur. Air continues to flow back and forth between bellows chamber 198 and piston chamber 199 through openings 185 until pressures within the piston chamber and the bellows chamber have equalized.

The level of damping, as well as the frequency at which the highest level of damping occurs, may be tuned by adjusting the relative sizes of internal volume V1$a$ of piston chamber 199, internal volume V2$a$ of bellows chamber 198, and/or openings 185. For example, a relatively smaller internal volume V2$a$ of bellows chamber 198 will generally produce a higher level of damping, as the pressure change within the bellows chamber will be higher for a given event such that a higher-pressure differential will result in more flow through openings 185, thereby resulting in increased damping. More particularly, the relatively smaller internal volume V2$a$ of bellows chamber 198 provides a higher level of damping when the internal volume of the bellows chamber is reduced without reducing a diameter of bellows 141, which would otherwise decrease the pressure change within the bellows chamber for a given event. In addition, a relatively larger internal volume V1$a$ of piston chamber 199 will also generally produce a higher level of damping because more air will need to flow through openings 185 before the piston chamber and bellows chamber 198 equalize, resulting in increased damping. Moreover, changing the relative cross-sectional area, shape, number, or even length of openings 185 may, in turn, affect the time it takes for the pressures in piston chamber 199 and bellows chamber 198 to equalize. Therefore, the cross-sectional area of openings 185 can be altered to both vary the level of damping and the frequency at which the highest level of damping occurs.

Prior art damping air spring 124, while providing adequate damping to the axle/suspension system of the heavy-duty vehicle, has potential disadvantages, drawbacks, and limitations. For example, heavy-duty vehicles generally have multiple frequency ranges where increased damping of the axle/suspension system(s) is critical, such as from about 0.8 Hz to about 2.0 Hz and also from about 8 Hz to about 15 Hz. However, prior art air spring 124 generally only provides peak damping characteristics for a single critical frequency range, i.e., the lower frequency range of from about 0.8 Hz to about 2.0 Hz. In addition, air spring 124 generally requires a greater internal volume V1*a* of piston chamber 199 of piston 142 and reduced internal volume V2*a* of bellows chamber 198 of bellows 141 in order to increase damping. However, increasing internal volume V1*a* of piston chamber 199 at the expense of internal volume V2*a* of bellows chamber 198 can impinge on the travel distance of air spring 124. More particularly, extending piston 142 into bellows chamber 198 reduces the distance between top plate 182 of piston 142 and/or bumper 181 and bellows plate 143, reducing the distance air spring 124 can be compressed during a jounce event. The damping air spring for heavy-duty vehicle axle/suspension systems of the present invention overcomes the above-referenced disadvantages, drawbacks, and limitations of prior art air springs 24 and 124, and will now be described.

Figure 3:
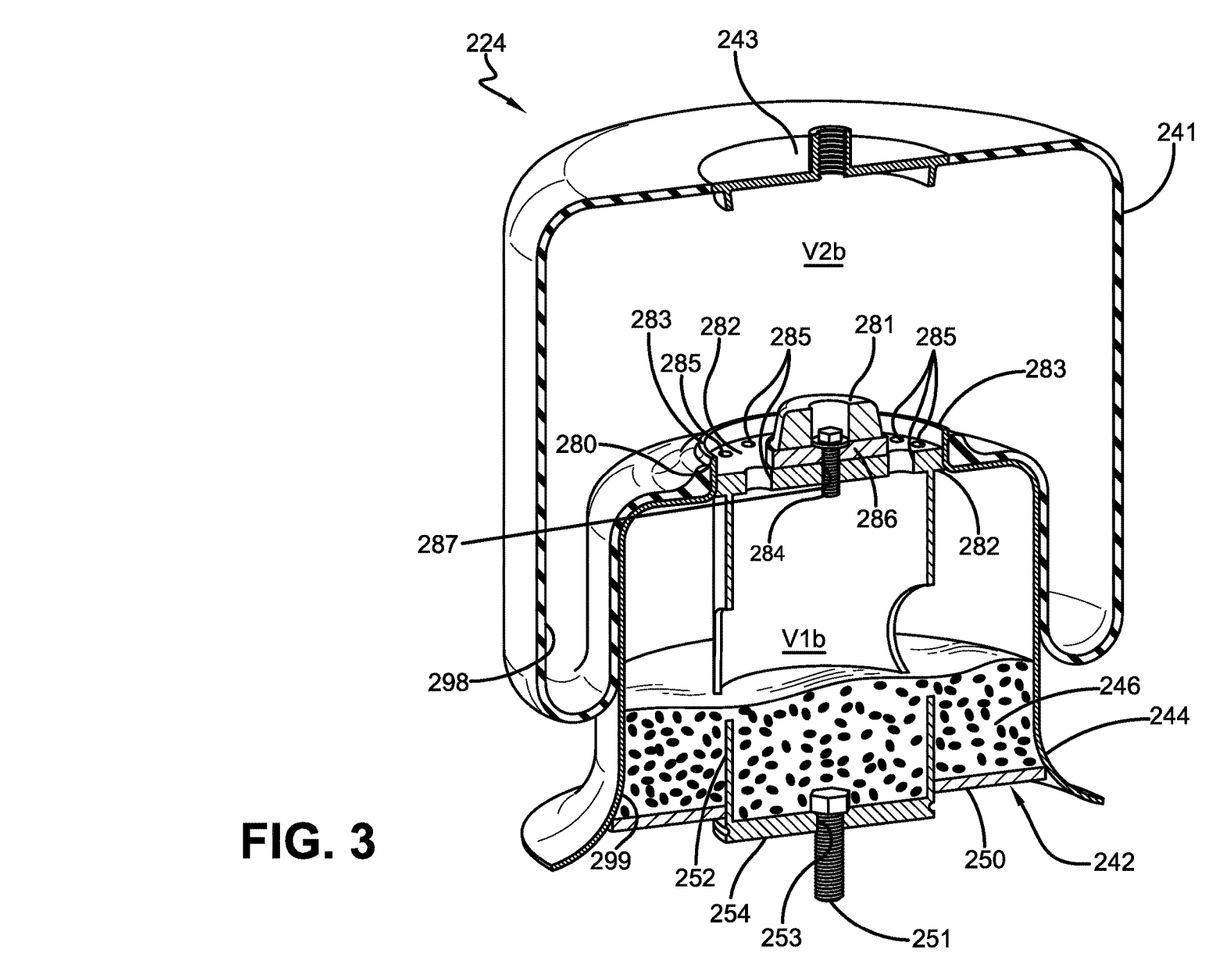
FIG. 3 is a perspective view, in cross-section, of an exemplary embodiment damping air spring for heavy-duty vehicle axle/suspension systems of the present invention, showing openings formed in a piston top plate between and communicating with a piston chamber and a bellows chamber, and showing an adsorbent material contained within the piston chamber.
Figure 4:
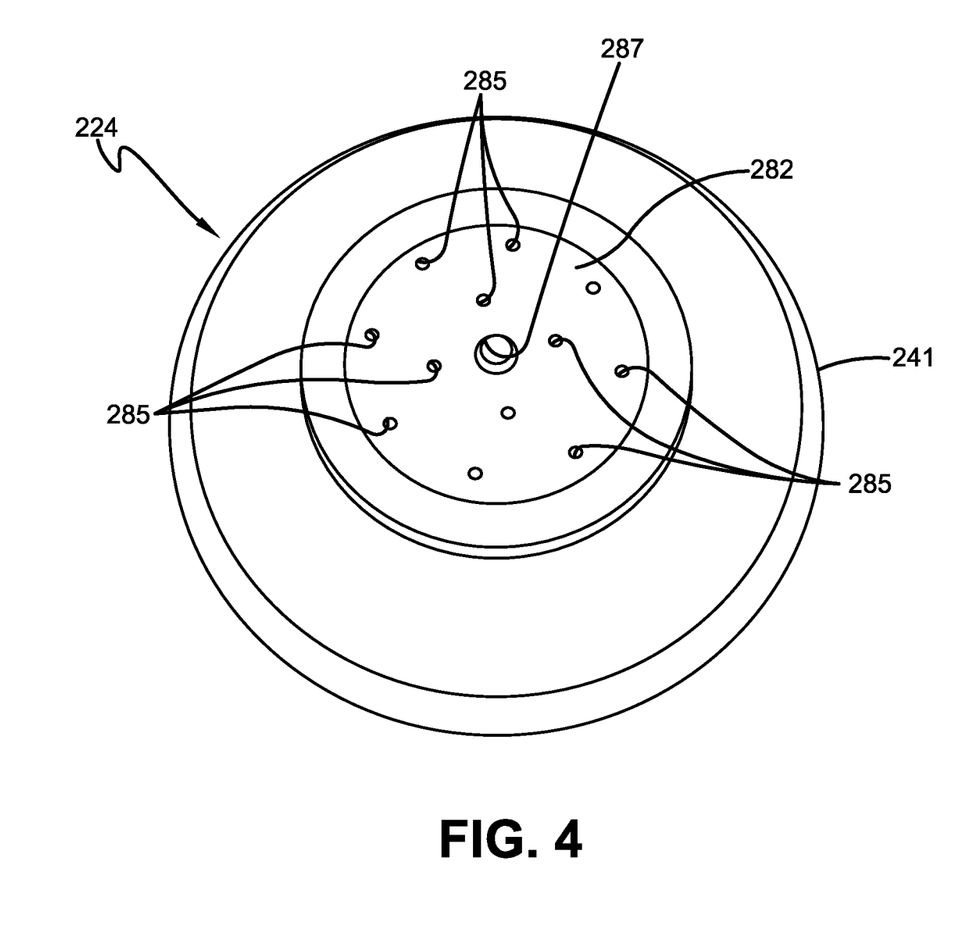
FIG. 4 is a top perspective view of a portion of the exemplary embodiment air spring shown in FIG. 3, showing the piston top plate with distributed openings.

An exemplary embodiment damping air spring for heavy-duty vehicle axle/suspension systems of the present invention is shown in FIGS. 3-4 and is indicated generally at 224. For purposes of this disclosure, exemplary embodiment damping air spring 224 is described as being incorporated into axle/suspension system 10 (FIG. 1), but may be incorporated into other suitable air-ride axle/suspension systems without affecting the overall concept or operation of the present invention. Exemplary embodiment damping air spring 224 generally includes a bellows 241 and a piston 242. With reference to FIG. 3, the top end of bellows 241 is sealingly engaged with a bellows top plate 243 by suitable means known in the art. An air spring mounting plate (not shown) may be mounted on the top surface of bellows top plate 243 by fasteners (not shown), which may also be used to attach exemplary embodiment damping air spring 224 to a respective one of the main members (not shown) of the frame (not shown) of the heavy-duty vehicle (not shown). Alternatively, bellows top plate 243 could also be attached directly to a respective one of the main members of the frame of the heavy-duty vehicle.

Piston 242 is generally cylindrical-shaped and includes a continuous generally stepped sidewall 244 rigidly attached to a generally flat bottom plate 250 by suitable means. Piston 242 includes a top plate 282, which is integrally formed with or otherwise rigidly attached to sidewall 244 of the piston. Piston 242 includes a generally cylindrically-shaped central hub 252, which extends upwardly from bottom plate 250 to top plate 282. Central hub 252 includes a bottom plate 254 formed with a central opening 253. A fastener 251 is disposed through opening 253, and in turn is utilized to attach piston 242 to top wall 65 (FIG. 1) of beam 18 (FIG. 1) at rear end 26 (FIG. 1) of the beam. Top plate 282 of piston 242 is formed with a circular upwardly-extending protrusion 283 having a lip 280 around its circumference. Lip 280 cooperates with the lowermost end of bellows 241 to form an air-tight seal between the bellows and the lip in a manner known in the art. A bumper 281 may be rigidly attached to a bumper mounting plate 286, which, in turn, is mounted on top plate 282 of piston 242 by a fastener 284 that engages an opening 287 formed in the top plate. Bumper 281 extends upwardly from the top surface of bumper mounting plate 286 and provides a cushion between top plate 282 of piston 242 and bellows top plate 243 to prevent the top plates from contacting and potentially damaging one another during operation of the heavy-duty vehicle. With reference to FIGS. 3-4, top plate 282 of piston 242 is formed with a plurality of openings 285 that allow restricted fluid communication between internal volume V1*b* of piston chamber 299 and internal volume V2*b* of bellows chamber 298 to provide exemplary embodiment damping air spring 224 with damping, the importance of which will be described in detail below.

In accordance with an important aspect of the present invention, top plate 282, sidewall 244, bottom plate 250, and bottom plate 254 of piston 242 define a piston chamber 299 having an internal volume V1*b*. Internal volume V1*b* of piston chamber 299 is preferably from about 150 in$^3$ to about 6500 in$^3$. Bellows 241, bellows top plate 243, and top plate 282 of piston 242 define a bellows chamber 298 having an internal volume V2*b* at standard static ride height. Internal volume V2*b* of bellows chamber 298 is preferably from about 305 in$^3$ to about 915 in$^3$. Internal volume V1*b* of piston chamber 299 includes or is at least partially occupied by an adsorbent material 246 capable of adsorbing air, such as a material with a generally porous structure, for example, activated carbon. Adsorbent material 246 may be disposed within piston chamber 299 in a granular form, a pelletized form, a monolithic block, or may be in any other suitable form. Adsorbent material 246, due to chemical and structural properties, increases the functional amount of internal volume V1*b* of piston chamber 299 without altering the structure of piston 242, such as by undesirably increasing the height of the piston, and thus occupancy of the piston into bellows chamber 298, to effectively create more internal volume within the piston chamber, thereby effectively reducing the bellows-to-piston volume ratio and providing for increased damping. As a result, exemplary embodiment damping air spring 224 provides increased damping while maintaining the size of piston 242, thereby avoiding potential impingement on the travel of air spring 224. More particularly, use of adsorbent material 246 within piston chamber 299 increases damping in a first critical frequency range of from about 0.8 Hz to about 2.0 Hz, body bounce mode, from about 30% to about 50% compared to prior art damping air springs, such as prior art damping air spring 124.

In accordance with another important aspect of the present invention, and with particular reference to FIG. 4, as described above, top plate 282 of piston 242 is formed with plurality of openings 285, which allow restricted fluid communication between internal volume V1*b* of piston chamber 299 of piston 242 and internal volume V2*b* of bellows chamber 298 of bellows 241. More particularly, openings 285 allow fluid or air to pass between piston chamber 299 and bellows chamber 298 during operation of the heavy-duty vehicle. Openings 285 are generally circular shaped, but may be any other suitable shape, without affecting the overall concept or operation of the present invention. Openings 285 are generally distributed over top plate 282 of piston 242 such that the openings evenly cover the surface of the piston top plate, but may be arranged in any other suitable manner without affecting the overall concept or operation of the present invention. In particular, the arrangement of openings 285 in top plate 282 of piston 242 allows even exposure of air moving through the openings to adsorbent material 246 within piston chamber 299 such that the adsorbent material increases damping in the first critical frequency range of about 0.8 Hz to about 2.0 Hz. Moreover, the size of openings 285 may be adjusted to increase damping at a second critical frequency range of from about 8 Hz to about 15 Hz, wheel hop mode. More particularly openings 285 may have a total cross-sectional area in the range of from about 0.039 in.$^2$ to about 0.50 in.$^2$, more preferably from about 0.20 in.$^2$ to about 0.50 in.$^2$. It is contemplated that the ratio of the cross-sectional area of openings 285 measured in square inches (in.$^2$) to the internal volume V1b of piston chamber 299 measured in cubic inches (in.$^3$) to the internal volume V2b of bellows chamber 298 measured in cubic inches (in.$^3$) is in the range of ratios of from about 1:600:1200 to about 1:14100:23500. This is an inclusive range of ratios that may be alternatively expressed as 1:600-14100:1200-23500, including any combination of ratios in between, and, for example, would necessarily include the following ratios: 1:600:23500 and 1:14100:1200.

During operation of the heavy-duty vehicle, when axle 32 (FIG. 1) of axle/suspension system 10 (FIG. 1) experiences a jounce event, such as when the wheels of the heavy-duty vehicle encounter a curb or a raised bump in the road, the axle moves vertically upwardly toward the main member of the frame of the heavy-duty vehicle. As a result, bellows 241 is compressed by axle/suspension system 10 as the wheels of the heavy-duty vehicle travel over the curb or the raised bump in the road. The compression of bellows 241 causes the internal pressure of bellows chamber 298 of the bellows to increase, creating a pressure differential between the bellows chamber and piston chamber 299 of piston 242. This pressure differential causes air to flow from bellows chamber 298 through plurality of openings 285 into piston chamber 299. The flow of air into the piston chamber 299 causes a pressure differential between the piston chamber 299 and the internal pores of the adsorbent material 246. This pressure differential causes air to be adsorbed from the piston chamber 299 into the adsorbent material 246, further maintaining the pressure differential between the bellows chamber and the piston chamber, and causing damping to occur. Air continues to flow back and forth between bellows chamber 298 and piston chamber 299, and into and out of adsorbent material 246, through openings 285 and the porous structure of the adsorbent material until pressures within the piston chamber, bellows chamber, and the adsorbent material have equalized.

Conversely, when axle 32 (FIG. 1) of axle/suspension system 10 (FIG. 1) experiences a rebound event, such as when the wheels of the heavy-duty vehicle encounter a large hole or depression in the road, the axle moves vertically downwardly away from the main members (not shown) of the frame of the heavy-duty vehicle. As a result, bellows 241 is expanded by axle/suspension system 10 as the wheels of the heavy-duty vehicle travel into the hole or depression in the road. The expansion of bellows 241 causes the internal pressure of bellows chamber 298 to decrease, creating a pressure differential between the bellows chamber and piston chamber 299 of piston 242. This pressure differential causes air to flow out of piston chamber 299 through plurality of openings 285 into bellows chamber 298, reducing the pressure in the piston chamber. The reduced pressure in piston chamber 299 causes a pressure differential between the piston chamber and the internal pores of adsorbent material 246, which, in turn, causes air to be desorbed from the adsorbent material into the piston chamber 299, adding to the air flowing through openings 285 into bellows chamber 298, causing damping to occur. Air continues to flow back and forth between the adsorbent material 246, piston chamber 299, and bellows chamber 298 through openings 285 until pressures within the adsorbent material, the piston chamber, and the bellows chamber have equalized.

As described above, adsorbent material 246 occupying at least part of internal volume V1b of piston chamber 299 of piston 242 along with the cross-sectional area and distributed arrangement of openings 285 provide improved damping characteristics to exemplary embodiment damping air spring 224 at both critical frequency ranges during operation of the heavy-duty vehicle. In particular, use of adsorbent material 246 within piston chamber 299 allows the structural size of piston chamber 299 and bellows chamber 298 to remain unmodified while increasing the functional internal volume V1b of the piston chamber, and thus decreasing the functional bellows-to-piston volume ratio, in order to increase damping of air spring 224 in the body bounce mode frequency range of about 0.8 Hz to about 2.0 Hz. In addition, the even distribution of openings 285 in top plate 282 ensures adsorbent material 246 is evenly exposed to air flow through the openings, while the cross-sectional area of the openings increases damping of air spring 224 in the wheel hop mode frequency range of about 8 Hz to about 15 Hz.

Figure 5:
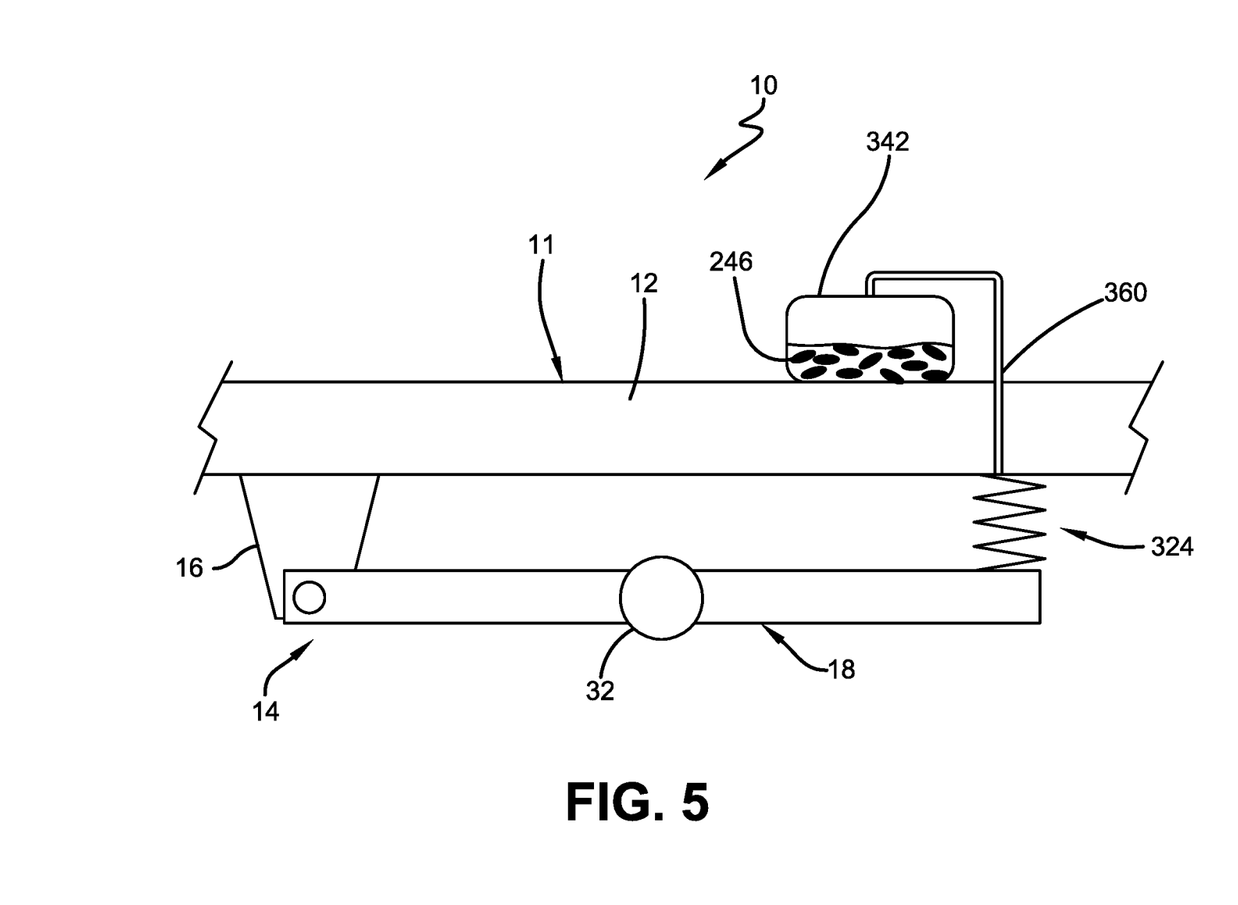
FIG. 5 is a schematic diagram of an alternative exemplary embodiment of the damping air spring for heavy-duty vehicle axle/suspension systems of the present invention, showing an air spring mounted between a beam of the axle/suspension system and a main member of the vehicle frame, the air spring having a bellows in restricted fluid communication with an external chamber containing adsorbent material.

Thus, exemplary embodiment damping air spring 224 for heavy-duty vehicle axle/suspension systems of the present invention overcomes the problems associated with prior art air springs, such as prior art air springs 24 and 124, by providing an air spring that has improved damping in both critical frequency ranges. Exemplary embodiment damping air spring 224 provides a piston 242 with adsorbent material 246 that at least partially occupies piston chamber 299, increasing the functional volume of internal volume V1b of the piston chamber and increasing damping in the body bounce mode frequency range of 0.8 Hz to 2.0 Hz, without requiring an increased structural volume or size, thereby preventing impingement on travel of the air spring. Exemplary embodiment damping air spring 224 also provides top plate 282 of piston 242 with plurality of openings 285 distributed over the top plate and having a cross-sectional area that increases damping in the wheel hop mode critical frequency range of about 8 Hz to about 15 Hz. By providing exemplary embodiment damping air spring 224, damping is optimized in both critical frequency ranges without the use of shock absorber 40 (FIG. 1) of axle/suspension system 10 (FIG. 1) such that the shock absorber can be eliminated or reduced in size, thereby reducing complexity, weight, and cost of the axle/suspension system, and increasing the amount of cargo the heavy-duty vehicle can carry. An alternative exemplary embodiment damping air spring for heavy-duty vehicle axle/suspension systems of the present invention is shown in FIG. 5 and is indicated generally at 324. Alternative exemplary embodiment damping air spring 324 is similar in function to exemplary embodiment damping air spring 224 described above, but instead includes a configuration where the air spring utilizes an external or remote chamber to provide damping to the air spring. For purposes of this disclosure, exemplary embodiment damping air spring 324 is shown incorporated into axle/suspension system 10 (FIG. 1), but may be incorporated into other suitable air-ride axle/suspension systems without affecting the overall concept or operation of the present invention.

Alternative exemplary embodiment damping air spring 324 generally includes a flexible bellows (not shown), the top end of which is sealingly engaged with a piston (not shown). The piston of alternative exemplary embodiment damping air spring 324 is mounted on beam 18 of suspension assembly 14 of axle/suspension system 10. The bellows of alternative exemplary embodiment damping air spring 324 in turn is connected to a main member 12 of a frame 11 of the heavy-duty duty vehicle. The bellows is in fluid communication with an external air source (not shown) located on the heavy-duty vehicle, which supplies air to the bellows during operation. Alternative exemplary embodiment damping air spring 324 also includes an external air chamber 342, such as a tank, which is mounted to main member 12 of frame 11 of the heavy-duty vehicle such that it is removed or remote from the bellows of the air spring. External air chamber 342 includes adsorbent material 246 disposed therewithin that at least partially occupies the external air chamber, which increases the functional volume of the internal volume of the external air chamber and increased damping in the body bounce mode frequency range of 0.8 Hz to 2.0 Hz. While external air chamber 342 is shown mounted to main member 12 of frame 11, it is to be understood that the air reservoir can be mounted on other components of the heavy-duty vehicle without affecting the overall concept or operation of the present invention.

External air chamber 342 is fluidly connected to bellows 341 via an air conduit 360. More specifically, the bellows of alternative exemplary embodiment damping air spring 324 is in restricted fluid communication with external air chamber 342 via the opening of air conduit 360 in the connection of the air conduit to the external air chamber and/or the opening of the air conduit in the connection of the air conduit to the bellows, which include a cross-sectional area, as set forth above with regard to exemplary embodiment damping air spring 224, that increases damping in the wheel hop mode critical frequency range of about 8 Hz to about 15 Hz in accordance with the concepts described above with regard to the exemplary embodiment damping air spring. Alternatively, the restricted fluid communication between the bellows and external air chamber 342 can be provided via one or more openings (not shown) formed in a plate (not shown) disposed within external air chamber 342 that include a cross-sectional area, as set forth above with regard to exemplary embodiment damping air spring 224, that increases damping in the wheel hop mode critical frequency range of about 8 Hz to about 15 Hz in accordance with the concepts described above with regard to the exemplary embodiment damping air spring. Accordingly, alternative exemplary embodiment air spring 324 provides the same benefits as exemplary embodiment damping air spring 224 described above.

It is contemplated that exemplary embodiment damping air spring 224 for heavy-duty vehicle axle/suspension systems of the present invention could be utilized on any heavy-duty vehicle, including buses, trucks, tractor-trailers or semi-trailers, trailers, and the like, having one or more than one axle without changing the overall concept or operation of the present invention. It is also contemplated that exemplary embodiment damping air spring 224 could be utilized on any heavy-duty vehicle having a frame or subframe, whether moveable or non-movable, without changing the overall concept or operation of the present invention. It is further contemplated that exemplary embodiment damping air spring 224 could be utilized on all types of air-ride beam-type axle/suspension system designs, such as overslung/top-mount, underslung/bottom-mount, spring-beam, non-torque reactive, independent, and 4-bag axle/suspension systems, including axle/suspension systems using U-bolts, U-bolt brackets/axle seats, and the like, or other types of suspensions without changing the overall concept or operation of the present invention. It is even contemplated that exemplary embodiment damping air spring 224 could be utilized in combination with shock absorbers without changing the overall concept or operation of the present invention.

It is further contemplated that exemplary embodiment damping air spring 224 could be formed from any suitable material or combination of materials, including composites, metal, and the like, without changing the overall concept or operation of the present invention. It is also contemplated that openings 285 of exemplary embodiment damping air spring 224 may have any suitable shape or size and may be formed in any suitable location on top plate 282 of piston 242, including locations other than those shown and described, without changing the overall concept or operation of the present invention. It is yet further contemplated that the concepts shown in exemplary embodiment damping air spring 224 could be utilized individually or in any combination in any type of air spring or structure utilized in conjunction with heavy-duty vehicles to provide damping, for example, a flexible bellows with a bellows chamber of a suspension assembly that is in restricted fluid communication with a structure (not shown) removed from or remote from the bellows chamber, such as a tank, wherein adsorptive material is located within either the bellows chamber and/or a chamber within the removed or remote structure, without changing the overall concept or operation of the present invention. It is also contemplated that adsorbent material 246 may be located in any other structures within exemplary embodiment damping air spring 224, such as bellows chamber 298 of bellows 241. It is yet further contemplated that the internal volume $V2b$ of bellows chamber 298, the internal volume $V1b$ of piston chamber 299, and/or the cross-sectional area of openings 285 could be dynamically altered during heavy-duty vehicle operation. More specifically, internal volume $V2b$, internal volume $V1b$, and/or the cross-sectional area of openings 285 could be altered during operation of the heavy-duty vehicle based upon the load carried by the heavy-duty vehicle to in order to improve damping characteristics of exemplary embodiment damping air spring 224 in accordance with a specific cargo or load size, without changing the overall concept or operation of the present invention. It is also contemplated that other types of suitable adsorbent materials 246 could be utilized, without changing the overall concept or operation of the present invention.

Accordingly, the damping air spring for heavy-duty vehicle axle/suspension systems of the present invention is simplified; provides an effective, safe, inexpensive, and efficient structure and method, which achieves all the enumerated objectives; provides for eliminating difficulties encountered with prior art air springs; and solves problems and obtains new results in the art.

In the foregoing description, certain terms have been used for brevity, clarity, and understanding, but no unnecessary limitations are to be implied therefrom beyond the requirements of the prior art because such terms are used for descriptive purposes and are intended to be broadly construed. The present invention has been described with reference to a specific embodiment. It is to be understood that this illustration is by way of example and not by way of limitation, as the scope of the invention is not limited to the exact details shown or described. Potential modifications and alterations will occur to others upon a reading and understanding of this disclosure, and it is understood that the invention includes all such modifications, alterations, and equivalents thereof.

Having now described the features, discoveries and principles of the present invention, the manner in which the damping air spring for heavy-duty vehicle axle/suspension systems is constructed, arranged and used, the characteristics of the construction and arrangement, and the advantageous, new and useful results obtained; the new and useful structures, devices, elements, arrangements, parts and combinations are set forth in the claims.

What is claimed is:

1. A damping air spring for a heavy-duty vehicle axle/suspension system comprising:
   a. a first chamber comprising a bellows chamber of a bellows;
   b. a second chamber comprising a piston chamber of a piston, said piston including a sidewall and a top plate, said top plate being sealingly engaged with said sidewall to form said piston chamber;
   c. at least one opening, said at least one opening being formed in the top plate of the piston between said first chamber and said second chamber and providing restricted fluid communication between the first chamber and the second chamber; and
   d. an adsorptive material disposed within said first chamber or said second chamber, said adsorptive material working in conjunction with said first chamber, said second chamber, and said at least one opening to provide damping characteristics to the damping air spring.

2. The damping air spring for a heavy-duty vehicle axle/suspension system of claim 1, wherein said at least one opening has a cross-sectional area of from 0.039 in$^2$ to 0.50 in$^2$.

3. The damping air spring for a heavy-duty vehicle axle/suspension system of claim 1, said second chamber having a volume of from 150 in$^3$ to 6500 in$^3$.

4. The damping air spring for a heavy-duty vehicle axle/suspension system of claim 3, said first chamber having a volume of from 305 in$^3$ to 915 in$^3$.

5. The damping air spring for a heavy-duty vehicle axle/suspension system of claim 1, wherein a ratio of said cross-sectional area in inches squared of said at least one opening to a volume of said first chamber in inches cubed to a volume of said second chamber in inches cubed is in the range of ratios from 1:600:1200 to 1:14100:23500.

6. The damping air spring for a heavy-duty vehicle axle/suspension system of claim 1, wherein said adsorptive material is activated carbon.

7. The damping air spring for a heavy-duty vehicle axle/suspension system of claim 1, said at least one opening comprising a plurality of openings, wherein a total cross-sectional area of said plurality of openings is from 0.039 in$^2$ to 0.50 in$^2$.

8. The damping air spring for a heavy-duty vehicle axle/suspension system of claim 7, said plurality of openings being evenly distributed about a top plate of said second chamber.

9. The damping air spring for a heavy-duty vehicle axle/suspension system of claim 1, said adsorptive material being capable of adsorbing air.

10. The damping air spring for a heavy-duty vehicle axle/suspension system of claim 1, wherein said adsorptive material includes a form selected from the group consisting of granular, pelletized, and a monolithic block.

11. The damping air spring for a heavy-duty vehicle of claim 1, wherein said at least one opening having a cross-sectional area of from 0.2 in$^2$ to 0.50 in$^2$.

12. The damping air spring for a heavy-duty vehicle of claim 1, wherein said restricted fluid communication and said adsorptive material work in combination to provide damping over a first critical frequency range and a second critical frequency range.

13. The damping air spring for a heavy-duty vehicle of claim 12, wherein said first critical frequency range is from 0.8 Hz to 2.0 Hz.

14. The damping air spring for a heavy-duty vehicle of claim 12, wherein said second critical frequency range is from 8 Hz to 15 Hz.

15. A damping air spring for a heavy-duty vehicle axle/suspension system comprising:
   a. a first chamber comprising a bellows chamber of a bellows;
   b. a second chamber, said second chamber being remote from said bellows;
   c. an air conduit, said air conduit fluidly connecting said bellows chamber to the second chamber, the air conduit providing restricted fluid communication between the first chamber and the second chamber; and
   d. an adsorptive material disposed within said second chamber, said adsorptive material working in conjunction with said first chamber, said second chamber, and said air conduit to provide damping characteristics to the damping air spring.

16. The damping air spring for a heavy-duty vehicle axle/suspension system of claim 15, wherein said second chamber is mounted to a main member of a frame of a heavy-duty vehicle.

17. The damping air spring for a heavy-duty vehicle axle/suspension system of claim 15, wherein said second chamber is a separate tank removed from said bellows.

* * * * *